United States Patent [19]

Broemer et al.

[11] 3,960,579

[45] June 1, 1976

[54] TITANIUM DIOXIDE CONTAINING GLASSES HAVING A HIGH INDEX OF REFRACTION AND A HIGH DISPERSION AND PROCESS OF PRODUCING SAME

[75] Inventors: Heinz Broemer, Hermannstein; Norbert Meinert; Johann Spincic, both of Wetzlar, all of Germany

[73] Assignee: Ernst Leitz GmbH, Optische Werke, Wetzlar, Germany

[22] Filed: Apr. 9, 1975

[21] Appl. No.: 566,306

Related U.S. Application Data

[63] Continuation of Ser. No. 308,696, Nov. 22, 1972, abandoned.

[30] Foreign Application Priority Data

Dec. 13, 1971  Germany............................ 2161701

[52] U.S. Cl.................................. 106/52; 106/47 Q; 106/53; 106/54
[51] Int. Cl.²...................... C03C 3/04; C03C 3/08; C03C 3/10; C03C 3/30
[58] Field of Search.................. 106/47 R, 47 Q, 52, 106/53, 54

[56] References Cited
UNITED STATES PATENTS

| | | | |
|---|---|---|---|
| 2,838,408 | 6/1958 | Rindone | 106/53 |
| 3,041,191 | 6/1962 | d'Adrian | 106/47 R |
| 3,195,030 | 7/1975 | Herczoz et al. | 106/47 R |
| 3,293,051 | 12/1966 | Searight | 106/47 R |
| 3,294,558 | 12/1966 | Searight et al. | 106/47 R |
| 3,294,559 | 12/1966 | Searight et al. | 106/54 |
| 3,468,681 | 9/1969 | Jaupain | 106/47 R |
| 3,703,389 | 11/1972 | Bromer et al. | 106/47 Q |
| 3,740,242 | 6/1973 | Faulstich et al. | 106/47 Q |

*Primary Examiner*—Winston A. Douglas
*Assistant Examiner*—Mark Bell
*Attorney, Agent, or Firm*—Erich M. H. Radde

[57] ABSTRACT

Optical silicate glasses containing titanium dioxide and having a high index of refraction and high dispersion are composed of 1 % to 10 %, by weight, of silicon dioxide $SiO_2$,
30 % to 50 %, by weight, of barium oxide BaO,
18 % to 24 %, by weight, aluminum oxide $Al_2O_3$, and
21 % to 30 %, by weight, of titanium dioxide $TiO_2$.

In such glasses the barium oxide can be replaced partially by sodium oxide $Na_2O$, beryllium oxide BeO, calcium oxide CaO, strontium oxide SrO, cadmium oxide CdO, gadolinium oxide $Ga_2O_3$, indium oxide $In_2O_3$, or yttrium oxide $Y_2O_3$. Likewise, the silicon dioxide therein can be replaced partially by boron trioxide $B_2O_3$, lead monoxide PbO, germanium dioxide $GeO_2$, stannic oxide $SnO_2$, zirconium oxide $ZrO_2$, hafnium oxide $HfO_2$, or thorium oxide $ThO_2$.

6 Claims, 3 Drawing Figures

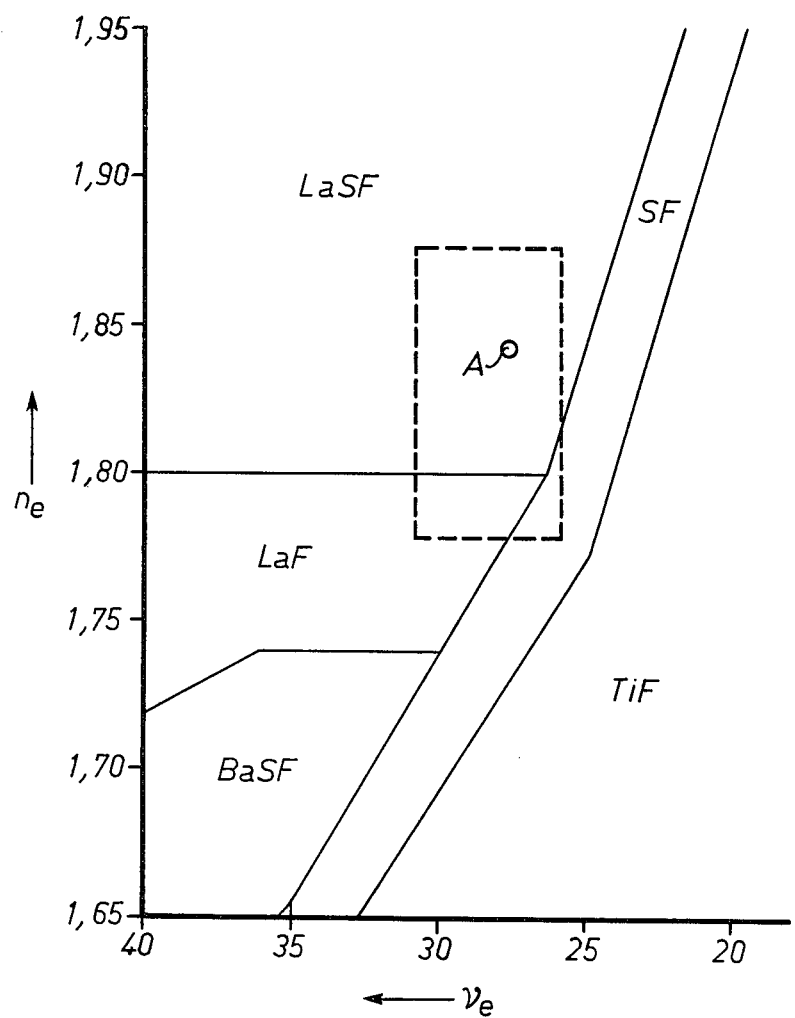

3,960,579

TITANIUM DIOXIDE CONTAINING GLASSES HAVING A HIGH INDEX OF REFRACTION AND A HIGH DISPERSION AND PROCESS OF PRODUCING SAME

This is a continuation of application Ser. No. 308,696 filed Nov. 22, 1972, now abandoned.

BACKGROUND OF THE INVENTION

1. FIELD OF THE INVENTION

The present invention relates to optical glasses and more particularly to optical silicate glasses containing titanium dioxide which glasses have a high dispersion and a high index of refraction, as well as to a process of producing the same.

2. DESCRIPTION OF THE PRIOR ART

Optical glasses of high titanium dioxide content are known; but in all such glasses, large quantities of conventional glass formers are used. In addition alkali metal oxides, preferably those of sodium oxide and/or potassium oxide, are generally added to the known glasses. By the use of alkali metal oxides, the melts become rather thinly liquid and, as a result thereof, the melting, fining, and conditioning processes are favorably affected.

Such glasses, however, have indices of refraction which are lower than 1.7. As a result thereof, they are useful for certain optical systems to a limited extent only.

Titanium-containing glasses which contain silicon dioxide and boron trioxide as glass formers and furthermore a small proportion of alkali metal oxides, are also known.

These glasses, as a result of their low content of alkali metal oxides, are extremely strongly colored and thus cannot be used for optical purposes. Furthermore, the large proportion of conventional glass formers and alkali metal oxides, as is known, results in a relatively poor chemical stability. Glasses of the known type are in particular sensitive to a greater or lesser extent to hand perspiration and, therefore, on being processed in the optical industry, result in considerable amounts of rejects which in their turn cause an increase in the price of the corresponding products.

SUMMARY OF THE INVENTION

It is one object of the present invention to provide optical glasses of improved chemical and optical properties which permit a wider use in modern optical systems and which are substantially free of the disadvantages of the known glasses.

Another object of the present invention is to provide a simple and effective process of making such optical glasses.

Other objects of the present invention and advantageous features thereof will become apparent as the description proceeds.

These objects are achieved in accordance with the present invention by providing glasses composed of
 1 % to 10 %, by weight, of silicon dioxide $SiO_2$;
 30 % to 50 %, by weight, of barium oxide BaO;
 18 % to 24 %, by weight, of aluminum oxide $Al_2O_3$; and
 21 % to 30 %, by weight, of titanium dioxide $TiO_2$.

According to a preferred embodiment of the present invention, barium oxide in such glass compositions can partly be replaced by one of the following oxides up to the maximum limits indicated:

up to 2 %, by weight, of beryllium oxide BeO;
 up to 4 %, by weight, of gadolinium oxide $Ga_2O_3$;
 up to 8 %, by weight, of calcium oxide CaO, cadmium oxide CdO, and/or indium oxide $In_2O_3$;
 up to 10 %, by weight, of sodium oxide $Na_2O$ and/or yttrium oxide $Y_2O_3$; and/or
 up to 16 %, by weight, of strontium oxide SrO.

It has also proved to be of advantage to replace the silicon dioxide in part by one of the following oxides up to the maximum limits indicated:

up to 2 %, by weight, of boron trioxide $B_2O_3$, lead monoxide PbO, zirconium oxide $ZrO_2$, hafnium oxide $HfO_2$, and/or thorium oxide $ThO_2$;
 up to 4 %, by weight, of stannic oxide $SnO_2$; and/or
 up to 6 %, by weight, of germanium dioxide $GeO_2$.

The glasses of the present invention are produced by melting mixtures of the components at a temperature between about 1400° and about 1500° C. under oxidizing conditions. It is essential that these conditions are carefully maintained, since otherwise the difficulties with respect to the incorporation of titanium in the glass cannot be overcome. As is known, the $Ti^{4+}$-ion prefers a coordination number of 6 for oxygen. If titanium enters the glass network as substitute for the $Si^{4+}$-ion, its coordination number is less than 6. Thus it is in a forced condition which it attempts to avoid by formation of clusters. In such a cluster, the titanium can achieve, at least partially, its coordination number of 6. This tendency leads to separation phenomena and to crystallization. Color effects and a clouding of the glass are the results thereof. It is also known that the colorless $Ti^{4+}$-ion can easily be reduced to the brown-violet $Ti^{3+}$-ion.

For all these reasons the following requirements regarding the melting down of optical glasses containing a high content of titanium must be met with: Oxidizing atmosphere and rapid passage through the above mentioned temperature range of maximum nucleation speed.

BRIEF DESCRIPTION OF THE DRAWINGS

For a better understanding of the present invention the attached drawings serve to illustrate the present invention without, however, limiting the same thereto. In these drawings

FIG. 3 shows a portion of the $\nu_e$–$n_e$ diagram and the range within which the glasses according to the present invention are located.

These FIGS. are to be considered together with the attached Tables I to III of preferred glass compositions according to the present invention. Thereby the glass composition of Example 6 is given as standard glass composition and is designated in the FIGS. 1 to 3 as "glass A".

DESCRIPTION OF THE PREFERRED EMBODIMENTS

The following examples serve to illustrate the present invention without, however, limiting the same thereto. The various components of the glasses of the composition as given hereinafter in the Tables are well mixed with each other to yield 1 kg. batches. Each batch is melted at about 1400° C. in an open platinum crucible. The temperature of the melt is increased to about 1500° C. within about 10 minutes and the melt is then homogenized by continuous stirring at said temperature over a period of about two hours. Thereupon, the melt is stirred while cooling to a temperature of about 950° C. within about 10 minutes, and is finally poured into steel molds preheated to about 600° C.

In Table I there are set forth glass compositions which contain exclusively the basic components of glasses according to the present invention. As stated above, the glass composition of Example 6 is selected as standard glass.

In Table II there are set forth a number of other glass compositions in which barium oxide is replaced partly by the other oxides listed.

Particularly noteworthy is the effect of an increase of the titanium dioxide content by only 2 % over that of the standard glass composition of Example 6 (Table I). Thereby 2 % of the barium oxide content of said standard glass composition are replaced by titanium dioxide. Such a glass composition, i.e. the composition of Example 7 of Table II, is characterized by an increase in the index of refraction and the dispersion. On the other hand, replacement of the barium oxide by 2 % of sodium oxide while the titanium dioxide content is the same as in the standard glass composition of Example 6 (Table I) causes a decrease of the index of refraction and at the same time an increase in the dispersion as is evident from the glass composition of Example 10 (Table II).

In Table III there are set forth examples of glass compositions in which the glass-forming silicon dioxide has partially been replaced by boron trioxide which is also a glass-forming substance (Example 9) or by other oxides.

Figure 1:
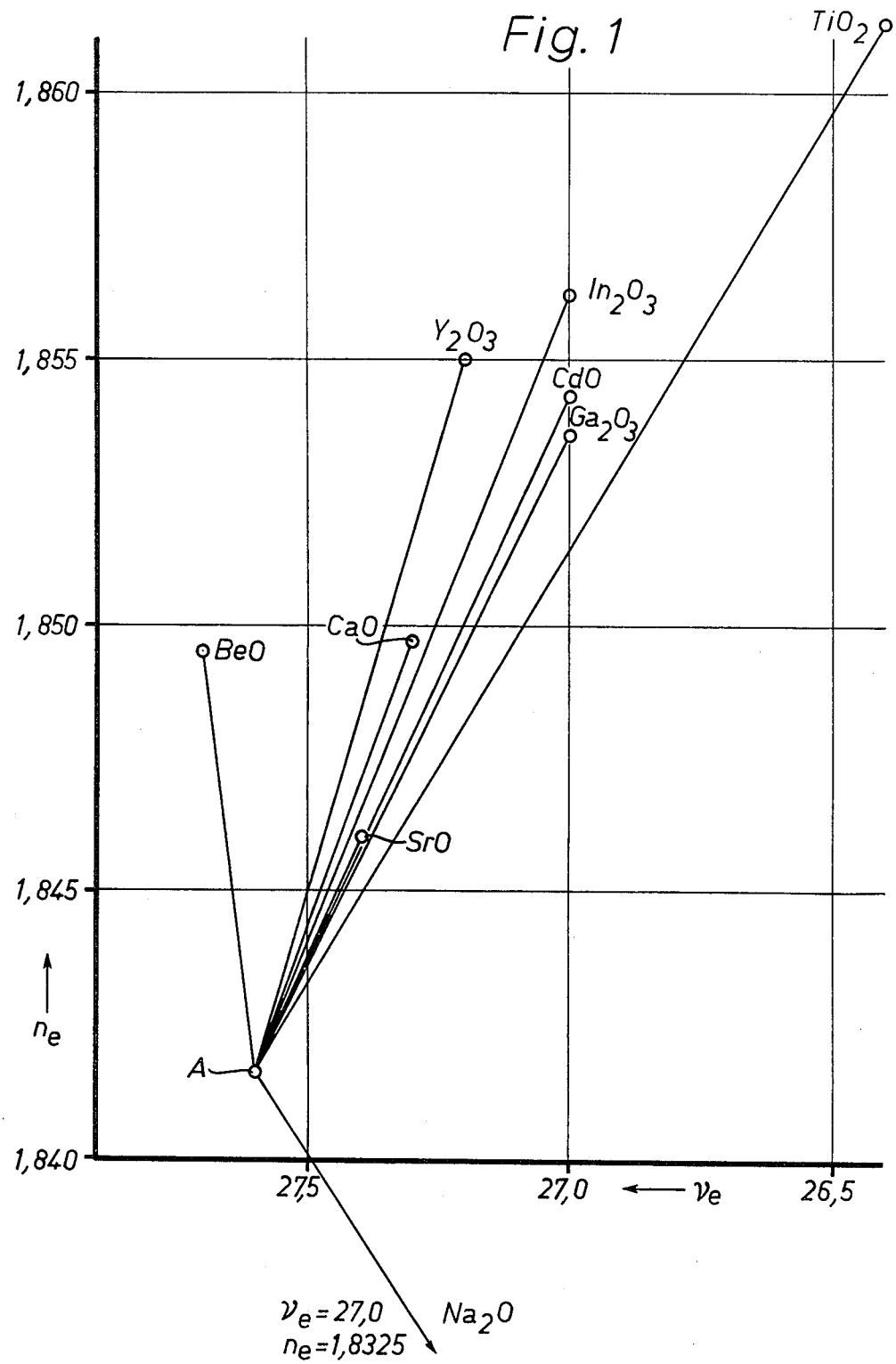
FIG. 1 illustrates the effect of a partial replacement of 2 %, by weight, of barium oxide, in each case, by 2 %, by weight, of the other oxides indicated whereby the resulting changes in the index of refraction $n_e$ and the dispersion or Abbe number $\nu_e$ are shown graphically.
Figure 2:
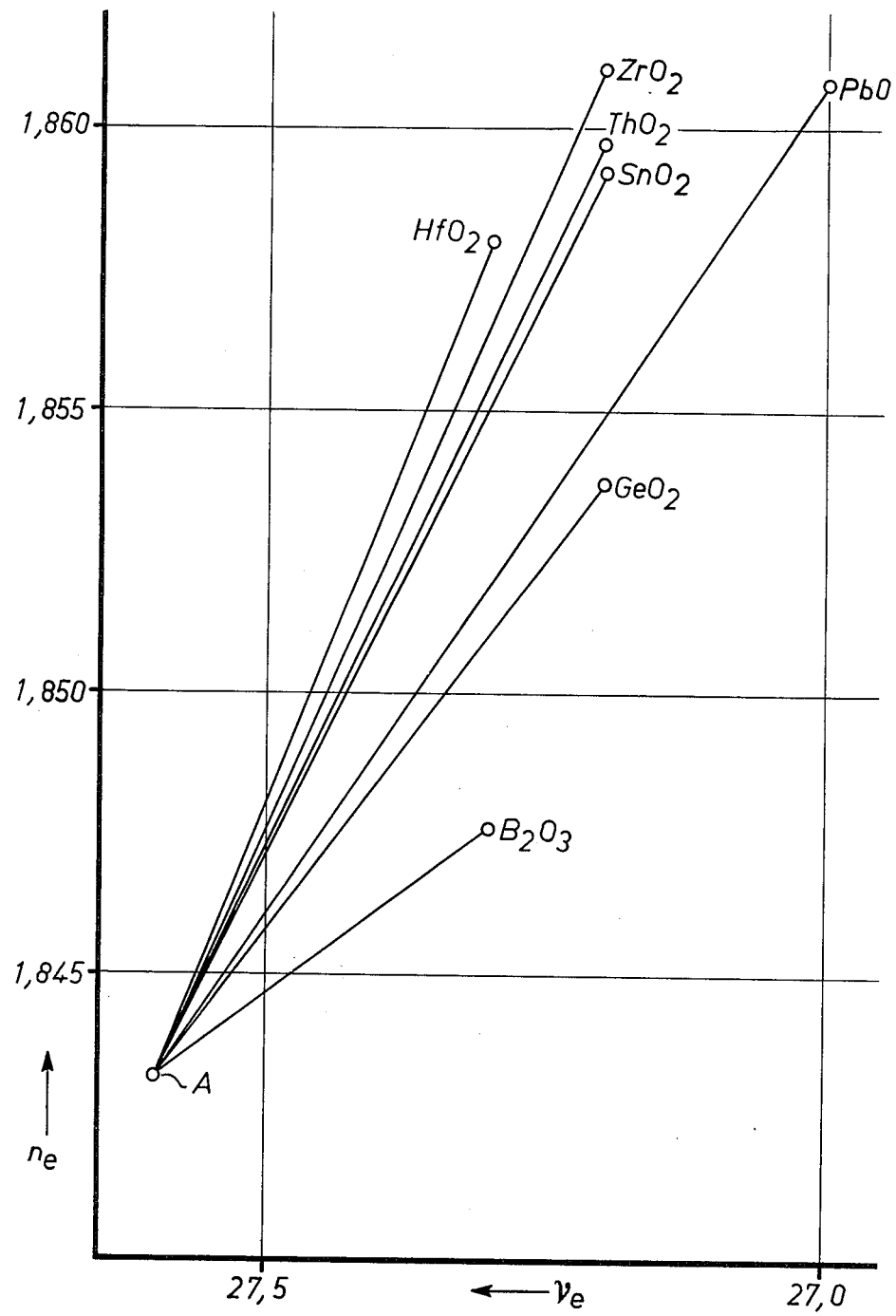
FIG. 2 shows the effect of partial replacement of 2 %, by weight, of silicon dioxide, in each case, by 2 %, by weight, of the oxides indicated whereby the resulting changes in the optical indices ($n_e$, $\nu_e$) are shown graphically.

It is evident from Tables I to III and FIGS. 1 to 3 that optical silicate glasses according to the present invention with a high titanium dioxide content of 21 % to 30 %, by weight, are of great value in view of their high dispersion and an index of refraction substantially exceeding an index of 1.7 as heretofore attained. FIG. 3 shows that the glass compositions according to the present invention occupy a predetermined specific position within the range of glass compositions of the LaSF, LaF, and SF type (heavy lanthanum flint, lanthanum flint, and heavy flint type) which renders them especially suitable for many specific optical uses.

As illustrated by Tables I to III, the glass compositions of the invention exhibit an index of refraction $n_e$ between 1.7784 and 1.8753 and an Abbe number $\nu_e$ between 25.8 and 30.8 when the compositional ranges fall within the following limits:

between about 5 and 9.9%, by weight of silicon dioxide $SiO_2$;

between about 30 and 50%, by weight, of barium oxide BaO;

between about 18 and 24%, by weight, of aluminum oxide $Al_2O_3$; and between about 21 and 30%, by weight, of titanium dioxide $TiO_2$.

Due to the relatively low content of alkali metal hydroxides and simultaneously a relatively high content of aluminum oxide the glasses according to the present invention have also considerably improved chemical properties. Especially noteworthy are their improved resistance against unfavorable effects of the atmosphere. In addition thereto the hardness of said glasses and especially their abrasion, wear, and mar resistance, are considerably improved over that of the known glasses of this type.

Due to their improved physical and chemical properties the range of application of the glasses according to the present invention is very considerably increased. Thus they can be used as external or front lenses of optical systems of all kinds, for instance, of binoculars, objectives of cameras and microscopes, prism systems, and in general for all purposes where an optical glass of the advantageous and specific optical properties with the specific $n_e - \nu_e$ range is required.

In general, the oxidizing conditions on melting the glass composition of the present invention are achieved by carrying out the melting in an open crucible, for instance, a platinum crucible, i.e. with access of atmospheric oxygen to the melt.

TABLE I

| Example: | 1 | 2 | 3 | 4 | 5 | 6 | 7 |
|---|---|---|---|---|---|---|---|
| $SiO_2$ | 7.0 | 7.0 | 7.0 | 9.9 | 7.0 | 7.0 | 7.0 |
| BaO | 48.0 | 48.0 | 48.0 | 44.0 | 50.0 | 46.0 | 44.0 |
| $Al_2O_3$ | 24.0 | 22.0 | 20.0 | 20.0 | 18.0 | 20.0 | 19.0 |
| $TiO_2$ | 21.0 | 23.0 | 25.0 | 26.1 | 25.0 | 27.0 | 30.0 |
| $n_e$ | 1.7965 | 1.8138 | 1.8322 | 1.8339 | 1.8379 | 1.8432 | 1.8753 |
| $\nu_e$ | 30.8 | 29.7 | 29.5 | 27.6 | 28.4 | 27.6 | 25.8 |

TABLE II

| Example: | 8 | 10 | 11 | 12 | 13 | 14 | 15 | 16 | 17 | 18 |
|---|---|---|---|---|---|---|---|---|---|---|
| $SiO_2$ | 7.0 | 7.0 | 7.0 | 7.0 | 7.0 | 7.0 | 7.0 | 7.0 | 7.0 | 7.0 |
| BaO | 44.0 | 44.0 | 42.0 | 40.0 | 36.0 | 44.0 | 44.0 | 42.0 | 40.0 | 38.0 |
| $Al_2O_3$ | 20.0 | 20.0 | 20.0 | 20.0 | 20.0 | 20.0 | 20.0 | 20.0 | 20.0 | 20.0 |
| $TiO_2$ | 29.0 | 27.0 | 27.0 | 27.0 | 27.0 | 27.0 | 27.0 | 27.0 | 27.0 | 27.0 |
| $Na_2O$ | — | 2.0 | 4.0 | 6.0 | 10.0 | — | — | — | — | — |
| BeO | — | — | — | — | — | 2.0 | — | — | — | — |
| CaO | — | — | — | — | — | — | 2.0 | 4.0 | 6.0 | 8.0 |
| SrO | — | — | — | — | — | — | — | — | — | — |
| CdO | — | — | — | — | — | — | — | — | — | — |
| $Ga_2O_3$ | — | — | — | — | — | — | — | — | — | — |

TABLE II-continued

| | | | | | | | | | | |
|---|---|---|---|---|---|---|---|---|---|---|
| $In_2O_3$ | — | — | — | — | — | — | — | — | — | — |
| $Y_2O_3$ | — | — | — | — | — | — | — | — | — | — |
| $n_e$ | 1.8613 | 1.8325 | 1.8210 | 1.8060 | 1.7784 | 1.8495 | 1.8497 | 1.8456 | 1.8419 | 1.8405 |
| $\nu_e$ | 26.4 | 27.0 | 27.6 | 27.7 | 28.4 | 27.7 | 27.3 | 27.7 | 28.2 | 28.4 |
| Example: | 19 | 20 | 21 | 22 | 23 | 24 | 25 | 26 | 27 | 28 |
| $SiO_2$ | 7.0 | 7.0 | 7.0 | 7.0 | 7.0 | 7.0 | 7.0 | 7.0 | 7.0 | 7.0 |
| BaO | 44.0 | 42.0 | 40.0 | 36.0 | 32.0 | 30.0 | 44.0 | 42.0 | 40.0 | 38.0 |
| $Al_2O_3$ | 20.0 | 20.0 | 20.0 | 20.0 | 20.0 | 20.0 | 20.0 | 20.0 | 20.0 | 20.0 |
| $TiO_2$ | 27.0 | 27.0 | 27.0 | 27.0 | 27.0 | 27.0 | 27.0 | 27.0 | 27.0 | 27.0 |
| $Na_2O$ | — | — | — | — | — | — | — | — | — | — |
| BeO | — | — | — | — | — | — | — | — | — | — |
| CaO | — | — | — | — | — | — | — | — | — | — |
| SrO | 2.0 | 4.0 | 6.0 | 10.0 | 14.0 | 16.0 | — | — | — | — |
| CdO | — | — | — | — | — | — | 2.0 | 4.0 | 6.0 | 8.0 |
| $Ga_2O_3$ | — | — | — | — | — | — | — | — | — | — |
| $In_2O_3$ | — | — | — | — | — | — | — | — | — | — |
| $Y_2O_3$ | — | — | — | — | — | — | — | — | — | — |
| $n_e$ | 1.8460 | 1.8473 | 1.8456 | 1.8436 | 1.8435 | 1.8389 | 1.8543 | 1.8577 | 1.8632 | 1.8665 |
| $\nu_e$ | 27.4 | 27.4 | 27.6 | 27.7 | 27.6 | 28.0 | 27.0 | 26.4 | 26.4 | 26.2 |
| Example: | 30 | 31 | 32 | 33 | 34 | 35 | 36 | 37 | 38 | 39 |
| $SiO_2$ | 7.0 | 7.0 | 7.0 | 7.0 | 7.0 | 7.0 | 7.0 | 7.0 | 7.0 | 7.0 |
| BaO | 44.0 | 42.0 | 44.0 | 42.0 | 40.0 | 38.0 | 44.0 | 42.0 | 40.0 | 36.0 |
| $Al_2O_3$ | 20.0 | 20.0 | 20.0 | 20.0 | 20.0 | 20.0 | 20.0 | 20.0 | 20.0 | 20.0 |
| $TiO_2$ | 27.0 | 27.0 | 27.0 | 27.0 | 27.0 | 27.0 | 27.0 | 27.0 | 27.0 | 27.0 |
| $Na_2O$ | — | — | — | — | — | — | — | — | — | — |
| BeO | — | — | — | — | — | — | — | — | — | — |
| CaO | — | — | — | — | — | — | — | — | — | — |
| SrO | — | — | — | — | — | — | — | — | — | — |
| CdO | — | — | — | — | — | — | — | — | — | — |
| $Ga_2O_3$ | 2.0 | 4.0 | — | — | — | — | — | — | — | — |
| $In_2O_3$ | — | — | 2.0 | 4.0 | 6.0 | 8.0 | — | — | — | — |
| $Y_2O_3$ | — | — | — | — | — | — | 2.0 | 4.0 | 6.0 | 10.0 |
| $n_e$ | 1.8536 | 1.8569 | 1.8562 | 1.8638 | 1.8700 | 1.8728 | 1.8550 | 1.8581 | 1.8612 | 1.8721 |
| $\nu_e$ | 27.0 | 26.9 | 27.0 | 26.6 | 26.4 | 26.3 | 27.2 | 27.3 | 27.4 | 27.3 |

TABLE III

| Example: | 9 | 29 | 40 | 41 | 42 | 43 | 44 |
|---|---|---|---|---|---|---|---|
| $SiO_2$ | 5.0 | 5.0 | 5.0 | 5.0 | 5.0 | 5.0 | 5.0 |
| BaO | 46.0 | 46.0 | 46.0 | 46.0 | 46.0 | 46.0 | 46.0 |
| $Al_2O_3$ | 20.0 | 20.0 | 20.0 | 20.0 | 20.0 | 20.0 | 20.0 |
| $TiO_2$ | 27.0 | 27.0 | 27.0 | 27.0 | 27.0 | 27.0 | 27.0 |
| $B_2O_3$ | 2.0 | — | — | — | — | — | — |
| PbO | — | 2.0 | — | — | — | — | — |
| $GeO_2$ | — | — | 2.0 | — | — | — | — |
| $SnO_2$ | — | — | — | 2.0 | — | — | — |
| $ZrO_2$ | — | — | — | — | 2.0 | — | — |
| $HfO_2$ | — | — | — | — | — | 2.0 | — |
| $ThO_2$ | — | — | — | — | — | — | 2.0 |
| $n_e$ | 1.8476 | 1.8608 | 1.8537 | 1.8592 | 1.8610 | 1.8580 | 1.8597 |
| $\nu_e$ | 27.3 | 27.0 | 27.2 | 27.2 | 27.2 | 27.3 | 27.2 |

We claim:
1. An optical glass having an index of refraction $n_e$ between 1.7784 and 1.8753 and an Abbe number $\nu_e$ between 25.8 and 30.8, said glass consisting essentially of:
   between about 5 and 9.9%, by weight, of silicon dioxide $SiO_2$;
   between about 30 and 50%, by weight, of barium oxide BaO;
   between about 18 and 24%, by weight, of aluminum oxide $Al_2O_3$; and
   between about 21 and 30%, by weight, of titanium dioxide $TiO_2$.

2. The optical glass composition as defined by claim 1, wherein the barium oxide is replaced partially by an amount of one of the oxides selected from the group of oxides consisting of sodium oxide $Na_2O$, beryllium oxide BeO, calcium oxide CaO, strontium oxide SrO, gadolinium oxide $Ga_2O_3$, indium oxide $In_2O_3$, and yttrium oxide $Y_2O_3$, whereby the amount of the oxide added to partly replace barium oxide is as follows:
   up to 10%, by weight, of sodium oxide,
   up to 2%, by weight, of berillium oxide,
   up to 8%, by weight, of calcium oxide,
   up to 16%, by weight, of strontium oxide,
   up to 8%, by weight, of cadmium oxide,
   up to 4%, by weight, of gadolinium oxide,
   up to 8%, by weight, of indium oxide, and
   up to 10%, by weight, of yttrium oxide.

3. The optical glass composition as defined by claim 1, wherein the silicon dioxide is replaced partially by an amount of one of the oxides selected from the group of oxides consisting of boron trioxide $B_2O_3$, lead monoxide PbO, germanium dioxide $GeO_2$, stannic oxide $SnO_2$, zirconium oxide $ZrO_2$, hafnium oxide $HfO_2$, and thorium oxide $ThO_2$, whereby the amount of the oxide added to partly replace silicon dioxide is as follows:
   up to 2%, by weight, of boron trioxide, up to 2%, by weight, of lead monoxide,
up to 6%, by weight, of germanium dioxide,
up to 4%, by weight, of stannic oxide,
up to 2%, by weight, of zirconium oxide,
up to 2%, by weight, of hafnium oxide, and
up to 2%, by weight, of thorium oxide.

4. The optical glass composition as defined by claim 1, wherein said glass composition consists of:
  between about 7% and 9.9%, by weight, of silicon dioxide $SiO_2$;
  between about 44% and 50%, by weight, of barium oxide BaO;
  between about 18% and 24%, by weight, of aluminum oxide $Al_2O_3$; and
  between about 21% and 30%, by weight, of titanium dioxide $TiO_2$.

5. The optical glass composition as defined by claim 1, consisting essentially of:
  7%, by weight, of silicon dioxide $SiO_2$;
  48%, by weight, of barium oxide BaO;
  24%, by weight, of aluminum oxide $Al_2O_3$; and
  21%, by weight, of titanium dioxide $TiO_2$.

6. The optical glass composition as defined by claim 1, consisting essentially of:
  7%, by weight, of silicon dioxide $SiO_2$;
  44%, by weight, of barium oxide BaO;
  19%, by weight, of aluminum oxide $Al_2O_3$; and
  30%, by weight, of titanium dioxide $TiO_2$.

* * * * *